Patented Dec. 13, 1938

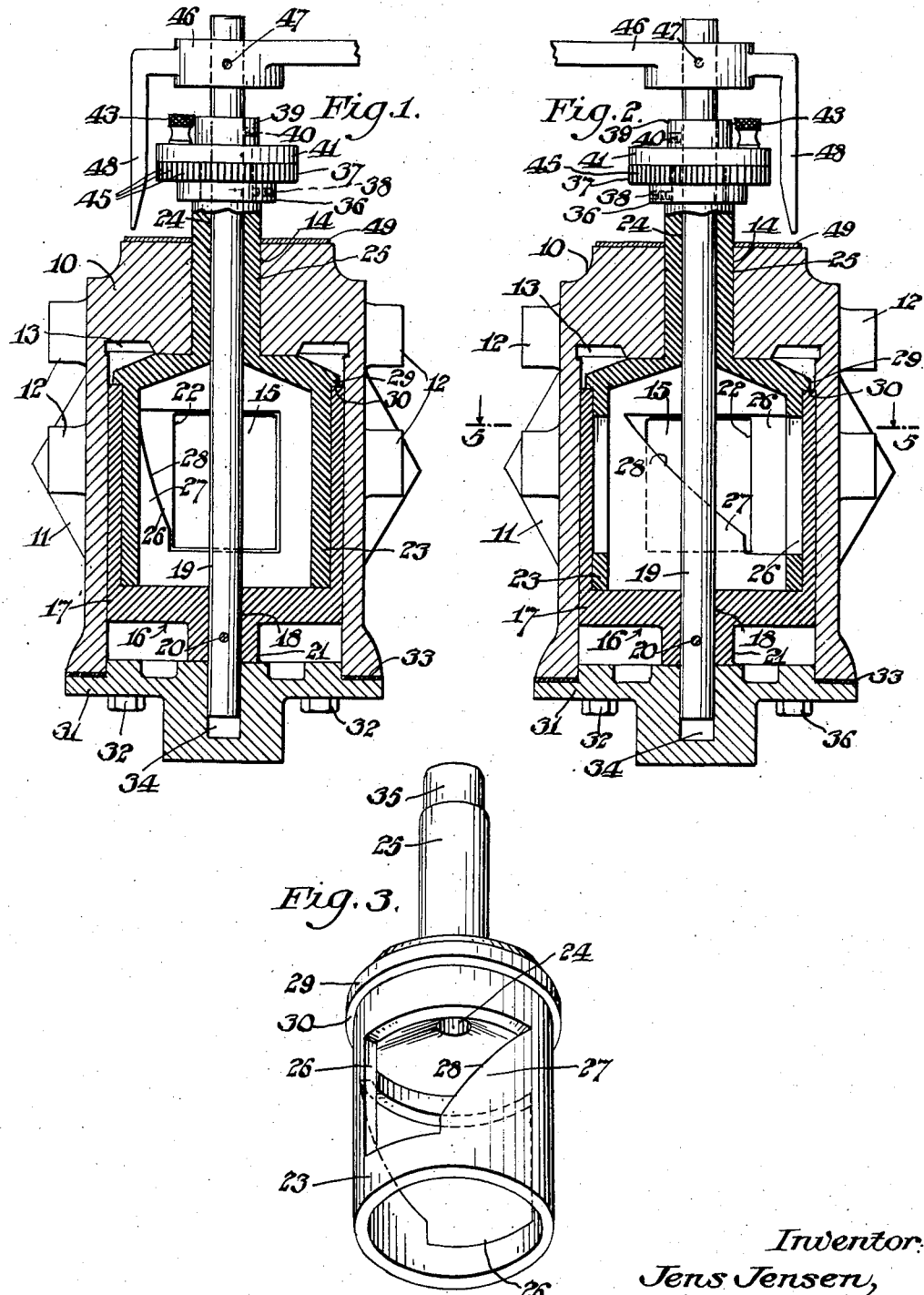

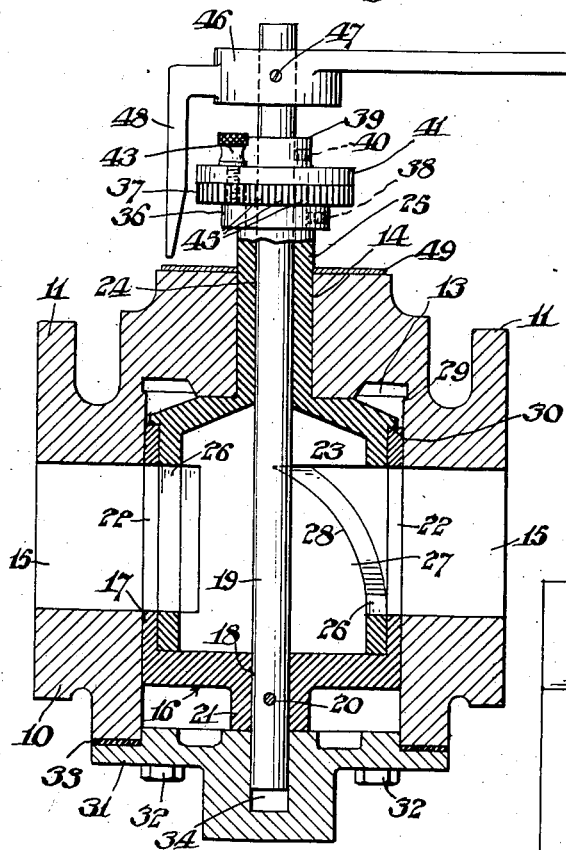
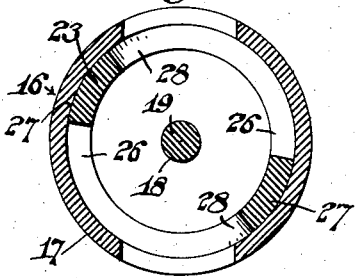
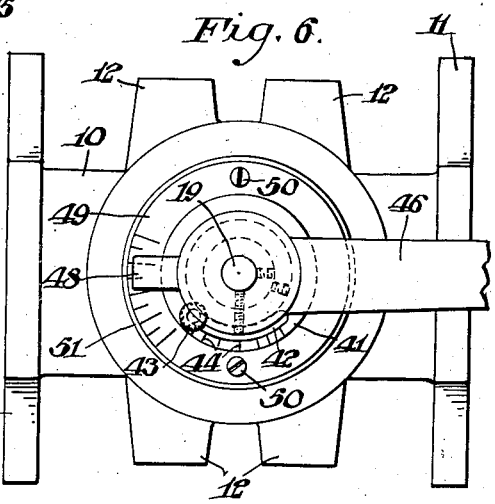

2,140,292

UNITED STATES PATENT OFFICE 2,140,292

AIR OR GAS CONTROLLING VALVE

Jens Jensen, Philadelphia, Pa.

Application April 19, 1937, Serial No. 137,748

3 Claims. (Cl. 251—92)

My invention relates to a new and useful air and gas controlling valve, particularly adapted for use in connection with regulating valves of fuel feeding systems for heating, annealing and tempering furnaces.

One of the objects of the invention is to provide a valve of the character stated wherein the flow of air or gas therethrough will be definitely determined and controlled although the valve plug is rotated its full opening stroke by automatic regulating mechanism which latter is actuated through changes in temperature.

Another object of the invention is to provide a valve having a two piece valve plug adjustable to regulate a passageway through said valve plug.

Another object of the invention is to provide a simple, effective and unique means for adjusting one element of the valve plug relative to the other element thereof and to hold said elements in their adjusted positions.

Another object of the present invention is to utilize the valve plug element adjusting means for indicating the size of opening through the valve plug whereby an operator may readily ascertain at all times the exact size of such opening. This provides for accuracy and eliminates all chance and guesswork.

Another object of the invention is to construct a valve plug of two telescoping cylindrical members one snugly fitting within the other but without any binding action.

A further object of this invention is to construct a valve plug consisting of an upright cylindrical cup having openings in its side walls equal in area to the openings in the casing and an inverted cylindrical cup telescoped in the first mentioned cup and having irregular shaped openings in its side walls forming segments which gradually cut off portions of the openings in the upright cup when one of said cups is rotated relative to the other.

A still further object of the invention is to provide a controlling valve comprising a casing having a valve plug receiving chamber and passageways communicating therewith to provide inlet and outlet ports, a two piece, straight cylindrical valve plug including an outer member having openings in its side walls of substantially the same area as the openings in the casing and an inner member with openings larger in area than the other openings but of such shape as to provide a triangular segment from the wall of said inner member whereby the rotation of the latter will partially close the openings in the outer member, said inner member is provided with a hollow shank through which the valve stem passes and to which the outer member is connected, means for adjustably rotating one of the valve plug members relative to the other, which means is located on the outside of the casing and is visible to as well as operable by a person, without the necessity of dismounting any of the parts, and said valve having means to indicate the movement of the valve plug as a whole.

With the above and other objects in view this invention consists of the details of construction and combination of elements hereinafter set forth and then designated by the claims.

In order that those skilled in the art to which this invention appertains may understand how to make and use the same, I will describe its construction in detail, referring by numerals to the accompanying drawings, in which:—

Fig. 1 is a longitudinal sectional view of a valve with portions left in elevation to illustrate an embodiment of my invention and showing the inner valve plug member in the fully open position relative to the outer valve plug member.

Fig. 2 is a similar view showing an inner valve plug member in a partially closed position relative to the outer valve plug member.

Fig. 3 is a perspective view of the inner valve plug member.

Fig. 4 is a longitudinal sectional view of the valve with some parts in elevation and at right angles to Figs. 1 and 2.

Fig. 5 is a transverse sectional view of the valve plug and its stem taken on the line 5—5 of Fig. 2.

Fig. 6 is an upper end view of Fig. 4 with a portion of the operating handle broken off.

Fig. 7 is a plan or upper end view of the elements for regulating the valve members relative to each other and holding said valve members in their adjusted positions.

Fig. 8 is a section on the line 8—8 of Fig. 7.

In carrying out my invention as herein embodied 10 represents a valve casing having flanges 11 at two opposite sides for connection in an air, gas or other pipe line and also with exterior projections 12 in which bolt holes may be produced for connecting the valve to any suitable support. This casing 10 is provided with a valve plug receiving chamber 13 wide open at one end, the same being the lower end as illustrated herein, and from said chamber 13 leads a hole 14 on the opposite end of the casing. From two opposite sides of the casing extend openings 15 which communicate with the valve plug receiving chamber and function as inlet and outlet ports and therefore are associated with the sides of the valve casing having the flanges 11.

In the valve plug receiving chamber 13 is rotatably mounted a two piece valve plug 16 consisting of an outer cylindrical member or upright cup 17 upon its inner end and closed at its outer end except for a hole 18 through which the valve stem 19 passes and said outer cylindrical member is fixed, at least temporarily, to the stem 19 by a pin 20 or equivalent means, and said pin 20 is shown as passing through a boss 21 extending from the outer closed end of said outer cylindrical valve plug member 17. In the side walls of said outer cylindrical member 17 are formed diametrically opposite openings 22 which are approximately the same cross sectional area as the openings 15 with which the openings 22 register under certain conditions as will be presently described.

It is to be understood that the side walls of said outer cylindrical member 17 are straight so as to snugly fit within the valve plug receiving chamber 13, but without any binding effect and in this outer cylindrical member is fitted an inner cylindrical member or inverted cup 23 so that its outer end is open while the inner end is closed except for a bore 24 through a shank 25 formed integral with the closed end of said cylindrical member 23. When the two cylindrical members are placed in cooperative relation with one telescoped inside of the other, the outer end wall of the outer member 17 forms a closure for the open end of the inner member and the inner closed end of said inner member functions as a closure for the inner open end of the outer member.

When the parts are assembled the shank 25 projects through a hole 14 in the valve casing and the valve stem 19 passes through the bore 24 in said shank 25 and in the side wall of said inner cylindrical member at diametrically opposite locations are formed the openings 26 of irregular shape so that a portion of each of these openings 26 is approximately of the same area as the openings 22 and 15 and with an additional portion thereby providing in the side wall of said inner member, generally triangular shaped segments 27 between the oblique or angular line 28 and imaginary base lines paralleling the top lines of the openings and imaginary perpendicular lines paralleling the straight side lines of the openings.

At the inner closed end of the inner member 23 is formed an exterior flange 29 providing a shoulder 30 which coacts with the inner edge of the outer cylindrical member 17.

After the valve plug has been mounted in the valve casing the open end of the valve plug receiving chamber is closed by a cap 31 connected to the casing in any suitable manner and for purposes of illustration bolts 32 are shown herein which are threaded into said casing and a gasket 33 may be located between the cap 31 and the casing to prevent leakage at the joint, said cap is provided with a hole 34 to receive one end of the valve stem 19. The outer end of the shank 25 is preferably reduced in circumference as at 35 and on this reduced end is mounted a collar 36 provided with a flange 37 and said collar is fixed, at least temporarily, to the shank 25 by a set screw 38. Cooperating with said collar 36 is another collar 39 fixed, at least temporarily, to the valve stem 19 by a set screw 40 and said collar 39 is provided with a flange 41 contiguous the flange 37. The flange 41 has an arcuate slot 42 formed therethrough from its outer to its inner face and through this slot projects the threaded shank of the locking bolt 43 which has threaded connection with the collar 36 and therefore clamps the collars together to hold them in any predetermined adjustment. The adjustment may be indicated by indication marks 44 on the outer face of the flange 41 in the region of the slot 42 and also by indication marks 45 on the perimeter of the flange 37 of the collar 36.

From the foregoing it will be obvious that when the locking bolt 43 is at one end of the slot 42 the openings 26 will be in such positions relative to the openings 22 that full flow of air or gas may pass through the valve providing, of course, the valve plug is in the open position so that the openings 22 are in alignment with the openings 15. By releasing the locking bolt 43 the collar 36 may be rotated relative to the collar 39 and this will rotate the inner valve plug member 23 relative to the outer valve plug member 17 and the segments 27 will be projected across the openings 22 according to the distance the inner valve plug member is rotated, thus partially closing the passageway through the valve and valve plug to cut down the flow of air or gas through the valve, even while the valve is in its open position.

On the outer end of said valve stem 19 is mounted a combined operating handle and indicator 46 held in place by a set screw 47 or equivalent fastening means and the indicating pointer 48 coacts with the dial plate 49 secured to the valve casing by screws 50 and having an index 51 delineated thereon.

After the valve plug members have been adjusted to permit the desired flow of air, gas or other fluid therethrough said flow remains constant unless the device is readjusted and whenever the device is fully opened by actuation of the operating handle 46 a definite amount of fluid will pass through the valve and the flow of fluid will be competely shut off when the operating handle is actuated in the opposite direction.

It will be obvious to those skilled in this particular art that when the valve is used to control the flow of gas, suitable stuffing boxes are provided at the ends of the valve plug to prevent escape of gas between the ends of the valve plug and casing.

Of course I do not wish to be limited to the exact details of construction herein shown and described as these may be varied within the scope of the appended claims without departing from the spirit of my invention.

Having thus described my invention, what I claim as new and useful is:—

1. An air and gas controlling valve comprising a casing having a valve plug chamber therein and opposite inlet and outlet ports communicating with said chamber, an outer cylindrical valve plug member rotatably mounted in said chamber and having a closed outer end except for a stem receiving hole and said member having oppositely positioned openings in its side walls which openings are substantially the same size and shape as the ports in the casing for selective registration therewith, an inner cylindrical valve plug member having a substantially closed inner end and provided with oppositely positioned openings in its side walls which openings are larger than the openings in the outer valve plug member and of such shape as to provide base edges and upper edges parallel with the base edges, and perpendicular side edges at one side of each opening and oblique edges at the opposite sides of the openings, said inner member being mounted within the outer member and selectively rotatable so that the oblique edge may be projected across the openings in the outer member to partially close the openings in said outer member, a hollow shank carried by the inner end of the inner member and projecting through the casing, a valve stem passing through said shank and the outer wall of the outer member, means to fix said outer member to the stem, a collar connected to the projecting end of the stem, a flange on said collar and having an arcuate slot, a collar attached to the shank of the inner valve plug member, the flange of the last named collar underlying the flange of the first named collar, means projecting through the slot and cooperating with the flange of the collar attached to the shank whereby the inner valve plug member may be held in an adjusted position relative to the outer valve plug member, and means on the projecting end of the stem for rotating both of the valve plug members in unison.

2. A valve comprising a casing having a valve plug receiving chamber therein and oppositely disposed ports communicating with said chamber, a valve plug consisting of two telescoping cylindrical members each having oppositely disposed openings in its side walls, the openings in one of said members being of different shape and size than the openings in the other member whereby closing segments are produced for reducing the passageway through the valve plug, a hollow shank on one of the members projecting through the casing, the outer end of said shank being reduced in circumference, a valve stem projected through the shank and the members of the valve plug, means for securing the member without a shank to the stem, a collar secured on the reduced end of the shank, a flange on said collar, graduation marks on the circumference of said flange, another collar secured to the valve stem adjacent the first mentioned collar, a flange on the second mentioned collar, said flange having an arcuate slot therein, graduation marks on the outer face of said last named flange in the region of the slot, a locking bolt projected through the arcuate slot and having threaded connection with the flange of the collar on the shank, said collars permitting adjustment of the valve plug members when the locking bolt is released, and when said locking bolt is screwed home, holding the valve plug members in their adjusted positions, and means for rotating the valve stem whereby the valve plug members may be rotated as a whole.

3. The structure in claim 2, wherein the inner valve plug member has an outwardly projecting flange to produce a shoulder for engagement with the inner end of the other valve plug member whereby said outer valve plug member assists in supporting said inner valve plug member.

JENS JENSEN.